(12) United States Patent
Kuhl et al.

(10) Patent No.: US 7,257,121 B2
(45) Date of Patent: Aug. 14, 2007

(54) SYSTEM AND METHOD FOR MAPPING QUALITY OF SERVICE LEVELS BETWEEN MPLS AND ATM CONNECTIONS IN A NETWORK ELEMENT

(75) Inventors: Timothy Harris Kuhl, Kanata (CA); Mark Jason Thibodeau, Nepean (CA); David J. Maxwell, Ottawa (CA); David Andrew Watkinson, Kanata (CA); John C. Fischer, Stittsville (CA)

(73) Assignee: Alcatel Canada Inc., Kanata (CA)

( * ) Notice: Subject to any disclaimer, the term of this patent is extended or adjusted under 35 U.S.C. 154(b) by 995 days.

(21) Appl. No.: 10/023,643

(22) Filed: Dec. 21, 2001

(65) Prior Publication Data

US 2003/0118026 A1    Jun. 26, 2003

(51) Int. Cl.
*H04L 12/56* (2006.01)
*H04L 12/66* (2006.01)
*H04L 12/46* (2006.01)

(52) U.S. Cl. ................. 370/395.5; 370/389; 370/395.6

(58) Field of Classification Search ..................... None
See application file for complete search history.

(56) References Cited

U.S. PATENT DOCUMENTS

| | | | |
|---|---|---|---|
| 6,631,122 B1* | 10/2003 | Arunachalam et al. | 370/332 |
| 6,633,571 B1* | 10/2003 | Sakamoto et al. | 370/401 |
| 6,693,912 B1* | 2/2004 | Wang | 370/401 |
| 6,791,985 B1* | 9/2004 | Ashwood-Smith et al. | 370/395.5 |
| 6,795,445 B1* | 9/2004 | Kabie et al. | 370/401 |
| 2001/0049739 A1* | 12/2001 | Wakayama et al. | 709/230 |
| 2002/0093980 A1* | 7/2002 | Trebes Jr. | 370/466 |
| 2002/0131408 A1* | 9/2002 | Hsu et al. | 370/355 |
| 2002/0136223 A1* | 9/2002 | Ho | 370/395.51 |
| 2003/0039246 A1* | 2/2003 | Guo et al. | 370/389 |
| 2003/0053464 A1* | 3/2003 | Chen et al. | 370/400 |
| 2003/0169751 A1* | 9/2003 | Pulkka et al. | 370/401 |
| 2004/0213242 A1* | 10/2004 | Ando et al. | 370/395.1 |
| 2006/0034292 A1* | 2/2006 | Wakayama et al. | 370/395.5 |

OTHER PUBLICATIONS

Andrikopoulos, et al; "Supporting Differentiated Services in MPLS Networks", 1999, IEEE International Workshop on Quality of Service, pp. 207-215.*

Sen, S et al, "A QoS Management Framework for 3G Wireless Networks", Wireless Communications and Networking Conference, 1999. WCNC, 1999 IEEE New Orleans, LA USA, pp. 1273-1277, XP010353695.

Alcatel, "ATM in the New Generation Network—ATM-MLPS Mediation", Alcatel Technical White Paper. Aug. 31, 2001, pp. 1-16, XP002236633.

* cited by examiner

*Primary Examiner*—Seema S. Rao
*Assistant Examiner*—Robert C Scheibel
(74) *Attorney, Agent, or Firm*—McCarthy Tetrault LLP

(57) ABSTRACT

A system and method of translating a set of transmission parameters related to a first transmission protocol from said first transmission protocol to a second transmission protocol for a data element being sent on a connection from a first communication network utilizing the first transmission protocol to a second communication network utilizing the second transmission protocol is provided. The method includes mapping a first parameter from the set of transmission parameters to a class of service value for the connection and mapping the class of service value and a second parameter from the set of transmission parameters to another parameter for the second transmission protocol.

18 Claims, 9 Drawing Sheets

| Service Category 502 | CLR 504 | CDV (μs) 506 | Class of Service 508 | |
|---|---|---|---|---|
| CBR | any | any | 1 | 510 |
| rtVBR | any | 250 ≤ CDV < 2,500 | 1 | 512 |
| rtVBR | any | 2,500 ≤ CDV ≤ 10,000 | 2 | 514 |
| nrtVBR | $10^{-7}$ | any | 3 | 516 |
| nrtVBR | $10^{-6}$ | any | 4 | 518 |
| nrtVBR | $10^{-5}$ | any | 5 | 520 |
| nrtVBR | $10^{-1}$ to $10^{-4}$ | any | 6 | 522 |
| ABR | any | any | 7 | 524 |
| UBR | any | any | 8 | 526 |

| | Class of Service | CLP = 0 | CLP = 1 |
|---|---|---|---|
| 710 | 1 | 0 | 1 |
| 712 | 2 | 2 | 3 |
| 714 | 3 | 4 | 5 |
| 716 | 4 | 4 | 5 |
| 718 | 5 | 4 | 5 |
| 720 | 6 | 4 | 5 |
| 722 | 7 | 6 | 7 |
| 724 | 8 | 6 | 7 |

SYSTEM AND METHOD FOR MAPPING QUALITY OF SERVICE LEVELS BETWEEN MPLS AND ATM CONNECTIONS IN A NETWORK ELEMENT

FIELD OF THE INVENTION

The invention relates to a system and method for mapping quality of service levels between a first communication network using a first protocol and a second communication network using a second protocol.

BACKGROUND OF INVENTION

MPLS is quickly gaining support in the communication industry as a high-speed core of many communication networks. Networks are being developed and deployed which interface ATM networks with MPLS networks. New network systems are being deployed which incorporate both MPLS and ATM network topologies.

Current draft standards allow for providing differentiated quality of service (QoS) levels in a MPLS network, as in an ATM network. A connection travelling through both an ATM network and a MPLS network may have separate, but similar, QoS levels associated with each network.

There is a need for a system mapping quality of service levels between MPLS and ATM connections in a network element.

SUMMARY OF INVENTION

In a first aspect, a method of translating a set of transmission parameters related to a first transmission protocol from said first transmission protocol to a second transmission protocol for a data element being sent on a connection from a first communication network utilizing the first transmission protocol to a second communication network utilizing the second transmission protocol is provided. The method includes mapping a first parameter from the set of transmission parameters to a class of service value for the connection and mapping the class of service value and a second parameter from the set of transmission parameters to another parameter for the second transmission protocol.

The first parameter may be a quality of service parameter for the connection in the first communication network and the second parameter may be a priority rating for the data element.

The method may further include converting the data element of the connection from at least one first data element associated with the first transmission protocol to a second data element associated with the second transmission protocol and associating the value of the another transmission parameter with the second data element The second parameter may indicate drop precedence and the another transmission parameter may indicate a quality of service provisioning for the connection in the second communication network and drop precedence for the second data element.

The second communication network may be an MPLS network, the second transmission protocol may be a MPLS transmission protocol and the second data element may be a MPLS frame.

The first communication network may be an ATM network, the first transmission protocol may be an ATM transmission protocol and each of the at least one first data element may be an ATM cell.

The MPLS frame may be provided to the MPLS network for transmission through an label switched path (LSP) and the value of the another transmission parameter may be inserted in an experimental field of the MPLS frame.

The first parameter may include at least one of ATM service category, cell loss ratio and cell delay variation.

The value of the drop precedence of the at least one ATM cell may utilize a value of drop precedence for the each of the at least one ATM cell.

The label switched path may be an experimental inferred per hop behaviour label switched path (E-LSP).

The second communication network may be an MPLS network, the second transmission protocol may be a MPLS transmission protocol, the second data element may be a MPLS frame the first communication network may be an ATM network, the first transmission protocol may be an ATM transmission protocol, each of the at least one first data element may be an ATM cell, the second parameter may indicate drop precedence for the ATM cell, the another transmission parameter may indicate drop precedence for the MPLS frame, the MPLS frame may be provided to the MPLS network for transmission through a label inferred per hop behaviour label switched path (L-LSP) and the value of the another transmission parameter may be inserted in an experimental field of the MPLS frame.

In a second aspect, a translation module of a network element is provided. The translation module translates a set of transmission parameters related to a first transmission protocol from the first transmission protocol to a second transmission protocol for a data element being sent on a connection from a first communication network utilizing the first transmission protocol to a second communication network utilizing the second transmission protocol. The network element is connected to the first communication network and the second communication network. The network element receives the data element from the first communication network and communicates the data element to the translation module. The network element transmits the data element from the network element over the second communication network after translation of the set of transmission parameters. The translation module includes a first sub-module mapping a first parameter from the set of transmission parameters to a class of service value for the connection and a second sub-module mapping the class of service value and a second parameter from the set of transmission parameters to another transmission parameter for the second transmission protocol.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 5 is a table of an exemplary mapping of ATM Quality of Service parameters to a class of service in the ATM/MPLS edge switch of FIG. 1;

FIG. 7 is a table of an exemplary mapping of class of service and drop precedence of a cell to a value for the EXP field in a MPLS frame in the ATM/MPLS edge switch of FIG. 1;

DETAILED DESCRIPTION OF THE EMBODIMENTS

Figure 1:
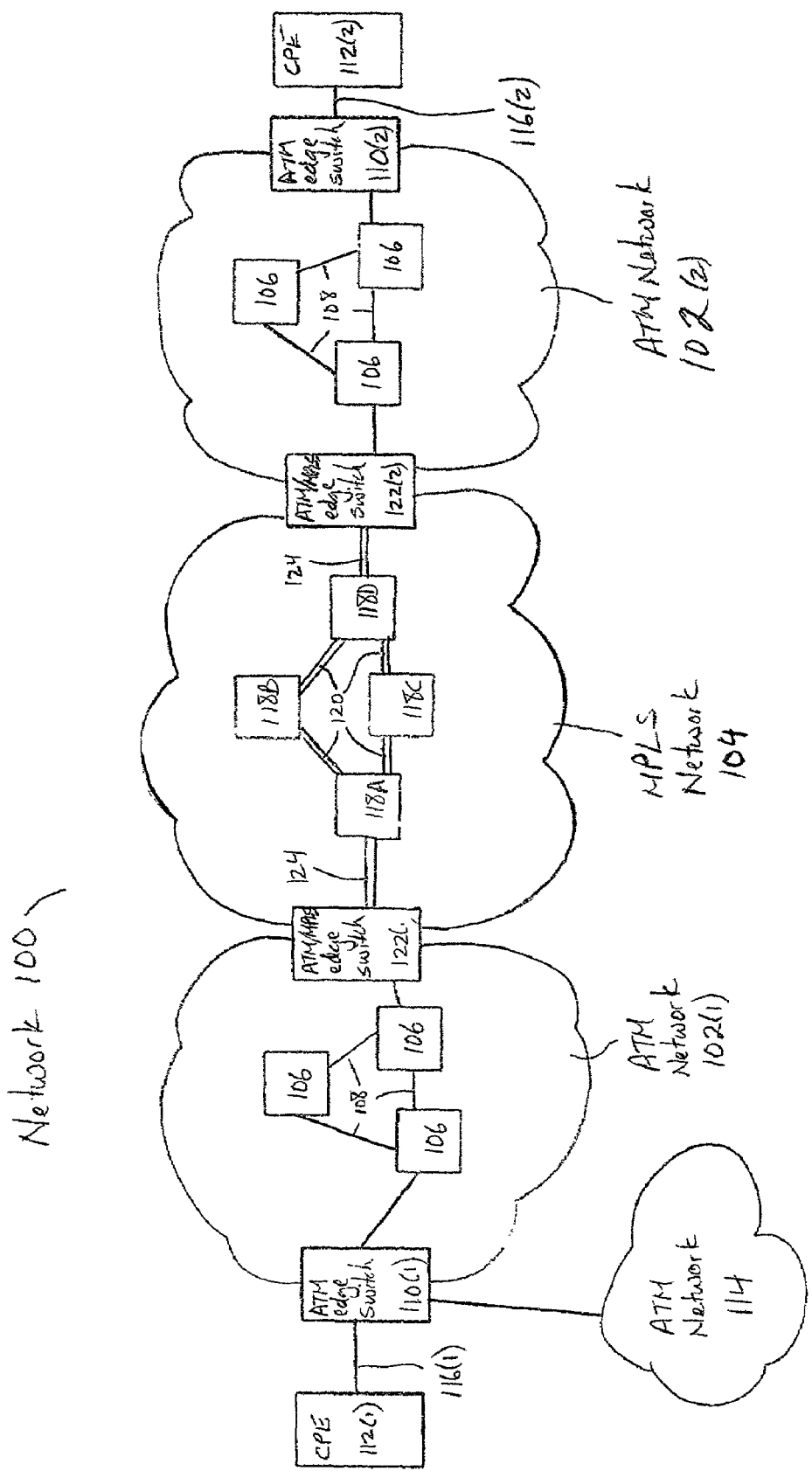
FIG. 1 is a block diagram of a communication network comprising two ATM networks and a Multi-Protocol Label Switching (MPLS) network connected by ATM/MPLS edge switches according to an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

1.0 Basic Features of System

Briefly, the embodiment provides a system and method for mapping Quality of Service (QoS) levels between MPLS and ATM connections in a network element. ATM QoS is provided for each connection in the ATM network and is negotiated when the connection is established. MPLS QoS is provided for a connection in a MPLS network by providing a value to an experimental (EXP) field for the outer label of a MPLS frame. In the network element, the ATM QoS value is mapped to an EXP value field for transmission over an EXP inferred per hop behaviour label switched path (E-LSP) in two stages. The first stage maps the ATM QoS parameters to a class of service for the connection when the connection is established. The second stage utilizes the class of service for the connection and the drop precedence of an individual ATM cell or frame to generate an appropriate EXP value. This value is inserted in the EXP field in the outer label of a MPLS frame. The mapping of ATM QoS to value of EXP field for a label inferred per hop behaviour label switched path (L-LSP) is provided in one step.

First, information on system configuration of a network which includes a switch of the embodiment is provided followed by a description of components and operation of the switch. Next, ATM and MPLS QoS levels are described with a method of configuring label switched paths (LSPs) in a MPLS network using the EXP field to provide MPLS QoS. Then a description of mapping of ATM QoS and drop precedence to EXP field value is provided for E-LSPs followed by a description of the mapping of drop precedence to EXP field value for L-LSPs. Finally, a description of customization of the various mappings is provided.

2.0 System Configuration

Following is a description of a network having a switch associated with the embodiment. Referring to FIG. 1, communications network 100 has a first ATM network 102(1), a second ATM network 102(2) and a multi-protocol label switched (MPLS) network 104. ATM networks 102 comprise a number of interconnected ATM switches 106 connected by communications links 108 which can each carry ATM traffic thereon.

At the edge of ATM network 102(1), ATM edge switch 110(1) provides a connection for Customer Premise Equipment (CPE) 112(1) to ATM network 102(1) via link 116(1). Similarly, at an edge of ATM network 102(2), ATM edge switch 110(2) provides a link for CPE 112(2) to ATM network 102(2) via link 116(2). It will be appreciated that ATM edge switch 110(1) may also have a connection to another ATM network 114. ATM edge switch 110(1) is connected to elements in ATM network 102(1). Similarly, ATM edge switch 110(2) is connected to elements in ATM network 102(2).

MPLS network 104 comprises MPLS switches 118 which are connected via communication links 120. At one edge of MPLS network 104, ATM/MPLS edge switch 122(1) provides an interface between ATM network 102(1) and MPLS network 104. At another edge of MPLS network 104, ATM/MPLS edge switch 122(2) provides an interface between ATM network 102(2) and MPLS network 104. ATM/MPLS edge switches 122 communicate with MPLS switches 118 in MPLS network 104 via communication links 124. Further detail on the structure of communication links 120 and 124 is provided below. Dedicated and prearranged MPLS routing paths between ATM/MPLS edge switches 122, for example ATM/MPLS edge switch 122(1) and ATM/MPLS edge switch 122(2), over links 120 and 124 are established to carry traffic in MPLS network 104. These MPLS routing paths, composed of two uni-directional label switched paths (LSPs) in MPLS network 104 are described later.

2.1 Switch Description

Figure 2:
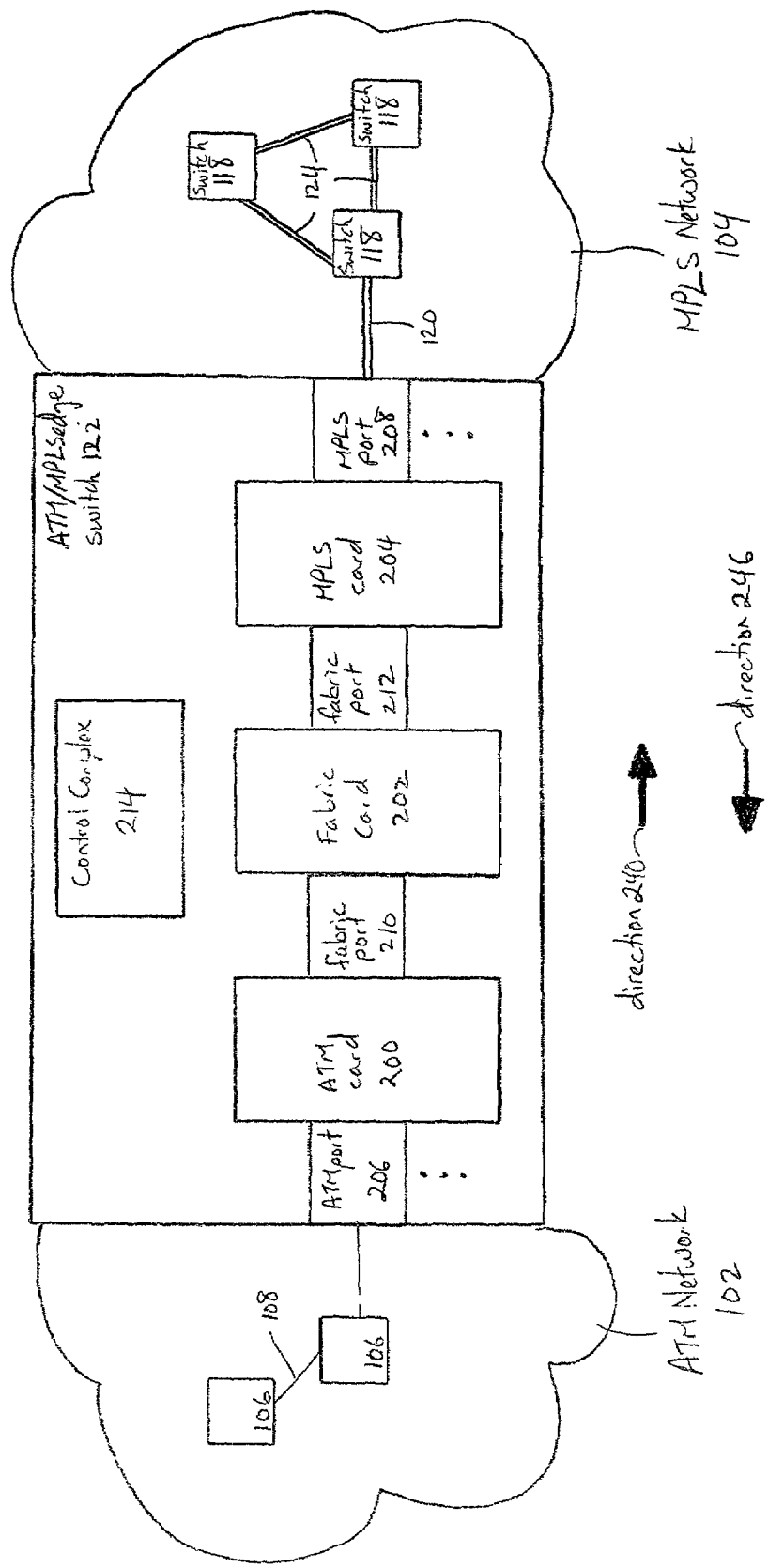
FIG. 2 is a block diagram showing the components of the ATM/MPLS edge switch of FIG. 1.

Referring to FIG. 2, ATM/MPLS edge switch 122 interfaces ATM network 102 with MPLS network 104. ATM/MPLS edge switch 122 comprises an ATM card 200 for interfacing with ATM network 102, a fabric card 202, an MLPS card 204 for interfacing with MPLS network 104, at least one ATM port 206, at least one MPLS port 208, two fabric ports 210 and 212, a control card 214 and two I/O cards (not shown).

ATM network 102 connects to ATM card 200 of ATM/MPLS edge switch 122 through ATM port 206 and an input/output (I/O) card (not shown). MPLS network 104 connects to MPLS card 204 through MPLS port 208 and an I/O card (not shown). Inside ATM/MPLS edge switch 122, ATM card 200 connects to fabric card 202 through fabric port 210 and fabric card 202 connects to MPLS card 204 through fabric port 212.

2.2 ATM and MPLS Format Conversion

As noted previously, ATM/MPLS edge switches 122 are at the edge of ATM network 102 and MPLS network 104. Accordingly, for data traffic travelling between ATM network 102 and MPLS network 104, ATM/MPLS edge switch 122(1) must translate ATM cells to and from MPLS frames depending on the direction of the dataflow. Any ATM frame traffic has been converted into ATM cells for transmission through ATM network 102 before reaching ATM card 200 of ATM/MPLS edge switch 122(1), as is known in the art.

Referring to FIG. 2, a description of conversion between ATM cells and MPLS frames in ATM/MPLS edge switch 122 is provided. In direction 240, for traffic bound for MPLS network 104, ATM card 200 receives ATM cells transmitted from ATM network 102. ATM card 200 adds an internal header to cell-based traffic for internal switching within ATM/MPLS edge switch 122. ATM card 200 transmits internal cells to fabric card 202. Fabric card 202 transmits internal cells to the appropriate MPLS card 204. MPLS card 204 converts internal cells into MPLS frames and transmits the MPLS frames to MPLS network 104 for transmission to their ultimate destination.

Figure 3:
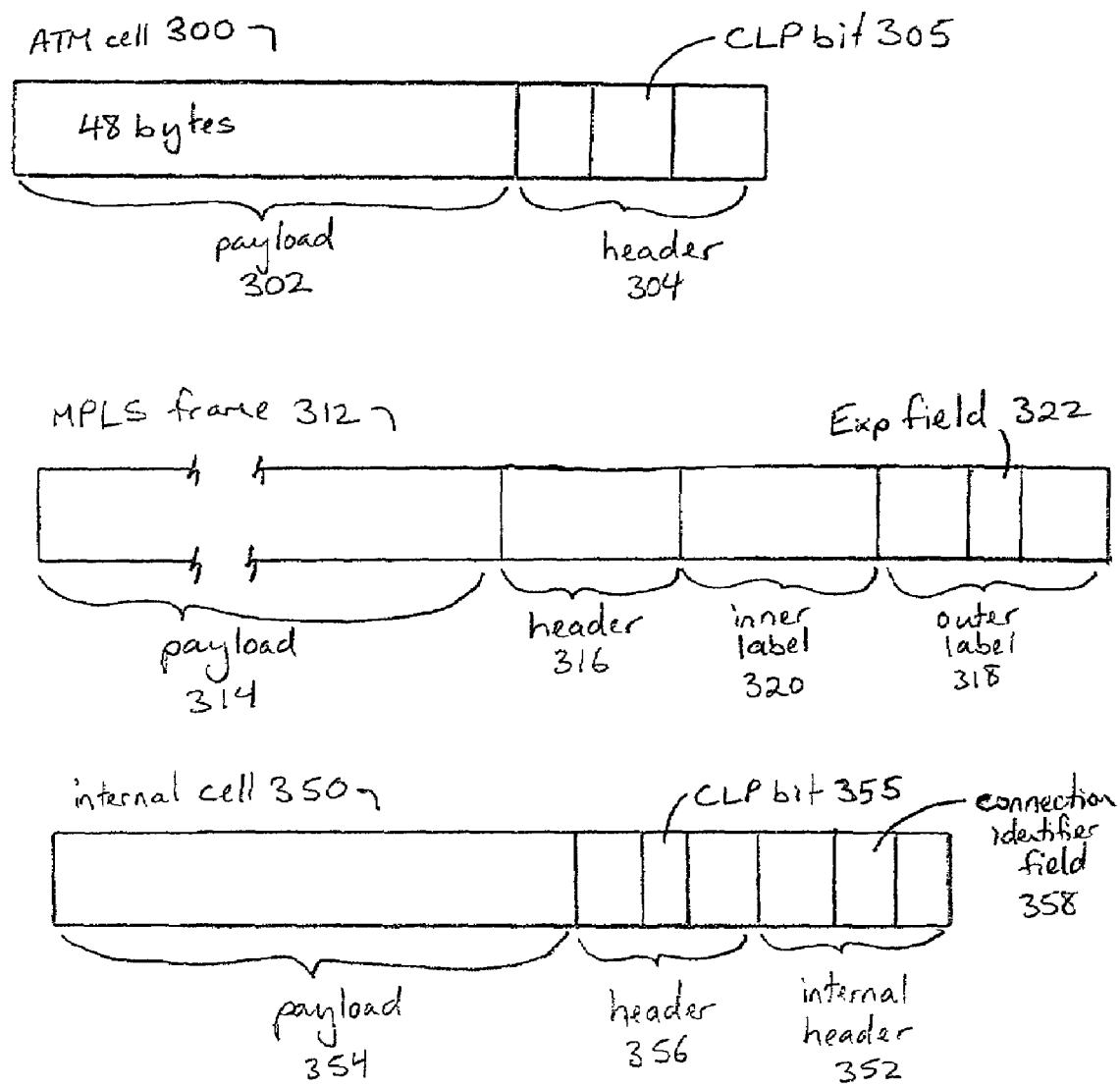
FIG. 3 is a block diagram of an ATM cell, a MPLS frame and an internal cell which are generated and manipulated by the ATM/MPLS edge switch which embodies the invention in the network of FIG. 1.

In direction 246, for traffic bound for ATM network 102, MPLS card 204 receives MPLS frames transmitted from MPLS network 104 and converts them into internal cells. Fabric card 202 receives internal cells transmitted from MPLS card 204 and transmits them to the appropriate ATM card 200. ATM card 200 converts internal cells into ATM cells and transmits them over ATM network 102 to their destination. Referring to FIG. 3, aspects of the conversion of ATM cells received by ATM/MPLS edge switch 122(1) to MPLS frames, and vice versa are shown.

ATM data received at ATM card 200 is encapsulated into cells 300. As is known in the art, cell 300 comprises 48 bytes of data in payload 302 and five bytes of header data in header 304. The header 304 includes data relating to error checks and destination information as is known in the art. Header 304 includes a cell loss priority (CLP) bit 305. CLP bit 305 indicates the drop precedence value of that particular cell 300 i.e. whether cell 300 is eligible to be "dropped", i.e. discarded, if congestion occurs in ATM network 102 and the cell cannot be processed. A value of zero (0) for CLP bit 305 indicates that cell 300 is not eligible to be discarded. A value of one (1) indicates that cell 300 is eligible to be discarded. The value of CLP bit 305 is typically set by the user, however, a network element receiving a cell 300 may change the value of CLP bit 305, as is known in the art. For example, a network element may change CLP bit 305 of a cell 300 from zero to one if it belongs to a connection that has violated its traffic contract with the network element. Frequently, ATM cells 300 are used to carry voice traffic in AAL 1/2/3/4/5 cell types, as is known in the art.

Data and header information for ATM cells 300 must be transposed into an internal cell 350 for switching within ATM/MPLS edge switch 122. For traffic destined for MPLS network 104, the internal cell 350 is then transposed into a MPLS frame 312 for transmission over MPLS network 104. Internal cell 350 comprises internal header 352, header 356 and payload 354. Within ATM/MPLS edge switch 122, ATM cell 300 is converted into internal cell 350 by the addition of internal header 352. Header 304 is mapped to header 356 and payload 302 is mapped to payload 354. Header 356 contains CLP bit 355 mapped from CLP bit 305 of header 304. Internal header 352 of internal cell 350 contains a connection identifier field 358 for the internal cell 350. The connection identifier for each connection is placed in connection identifier field 358 when converting cells 300 to internal cells 350. The value of the connection identifier of an internal cell 350 indicates connection and source information about internal cell 350 used by MPLS card 204 in mapping an appropriate value for EXP field 322, described later.

MPLS frame 312 comprises payload 314, header 316, outer label 318 and inner label 320. For traffic destined for MPLS network 104, MPLS card 204 converts one or more internal cells 350 to a MPLS frame 312. In conversion, the payloads 354 of one or more internal cells 350 are inserted into MPLS payload 314. Similarly, the contents of headers 356 are mapped into MPLS header 316. In the embodiment, header 316 is a component of payload 314. The contents of outer label 318 provide routing information for MPLS frame 312 through MPLS switches 118 MPLS network 104. Outer label 318 contains identification information relating to the MPLS routing path for the MPLS frame 306, and includes a three bit experimental (EXP) field 322. Inner label 320 contains connection information relating to the particular internal connection for the MPLS frame 312. The drop precedence of an individual ATM cell 300 or frame 306 and, in some circumstances, the QoS parameters of an ATM connection are transposed into the EXP field 322 thereby providing a provision for retaining ATM QoS aspects for MPLS frames 312. Further detail on the mapping is provided below.

3.0 ATM and MPLS Quality of Service

Each ATM connection in an ATM network 102 has quality of service (QoS) parameters which specifies a tolerable level of loss, errors, delay and delay variation of cells 300 or frames 306 in transmission through ATM network 102. These parameters include cell loss ratio (CLR), cell delay variation (CDV) and the ATM service category of the connection.

The CLR of an ATM connection specifies the maximum ratio of the number of cells lost to the total number of cells transmitted in the ATM connection. The CDV of an ATM connection specifies the maximum delay between arrival of successive cells for the ATM connection.

The ATM service category for an ATM connection defines traffic contract parameters and QoS characteristics for the connection. ATM service categories allow different connections to have different levels of priority and performance. An ATM connection may belong to a particular ATM service category based on the acceptable CLR and CDV values for the given connection. Defined service categories, known in the act, are:

CBR (Constant Bit Rate)—CBR category is provided to real-time data transmission, e.g. video, requiring a fixed amount of bandwidth provided at regular intervals. CBR connections have a low CLR, typically $10^{-9}$ or 1 of every $10^9$ cells lost, and a low CDV, typically hardcoded to 250μs, since applications in this service category cannot tolerate many lost cells or large variations in delay.

rt-VBR (Real-time Variable Bit Rate)—This category is useful for time-sensitive data traffic requiring a low CLR, typically $10^{-9}$, and low CDV, typically 250-10, 000 μs, as with CBR connections. However, a rt-VBR connection may have a transmission rate varying from the standard rate provided for the connection to a peak rate for the connection.

nrt-VBR (Non-real-time Variable Bit Rate)—This category is useful for data traffic with no constraints on CDV but have variable transmission rate between the standard rate and the peak rate for the connection. The CLR for ntr-VBR connections is typically set anywhere from $10^{-1}$ to $10^{-7}$.

ABR (Available Bit Rate)—Connections in this category require a low CLR but can tolerate a high CDV. The minimum amount of network resources are made available to an ABR connection providing the minimum transmission rate required but idle network capacity can be used to increase the transmission rate of this connection.

UBR Unspecified Bit Rate—Connections in this category do not need low CLR or CDV. Resources in ATM network 102 are provided to UBR connections on a "best effort" basis.

For MPLS traffic, differentiated levels of service providing different levels of priority and performance may also be supported in MPLS network 104. Current draft MPLS standards (IETF draft document, Le Faucheur, F., et al., "MPLS Support of Differentiated Services", April 2001) provide different levels of service in a MPLS network 104 for its MPLS routing paths where the desired QoS for a connection is indicated by the contents of outer label 318 of each MPLS frame 312 belonging to the connection.

Figure 4:
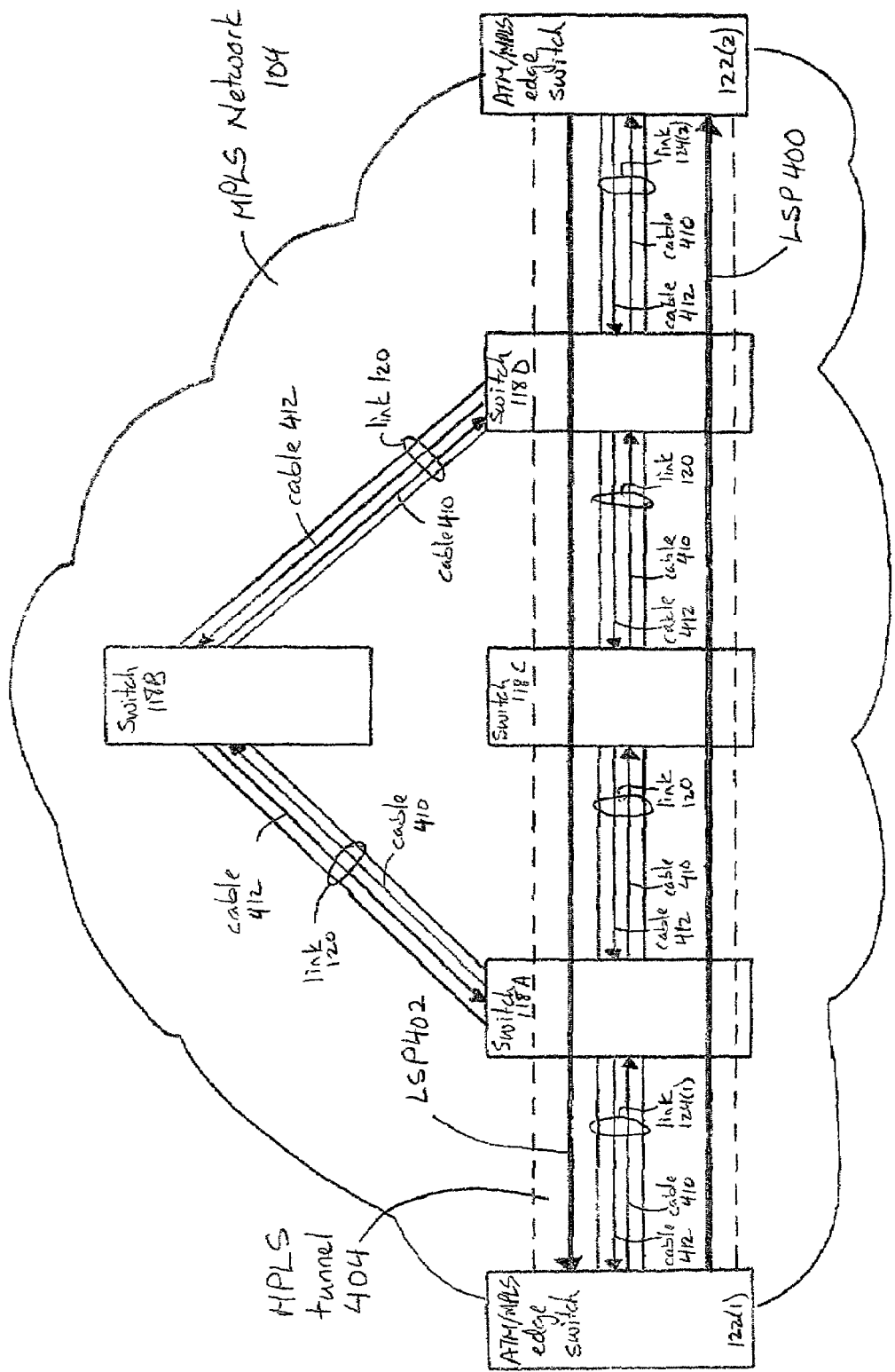
FIG. 4 is a block diagram of a tunnel connecting two ATM/MPLS edge switches in the MPLS network of FIG. 1.

Referring to FIG. 4, dedicated and pre-arranged MPLS routing paths or tunnels are composed of two unidirectional LSPs 400 and 402 between ATM/MPLS edge switches 122(1) and 122(2). It will be appreciated that the term "tunnel" is interchangeable with the term "MPLS routing path". In tunnel 404 a label switched path (LSP) 400 carries traffic from switch 122(1) to 122(2). Similarly, in tunnel 404, LSP 402 carries traffic from ATM/MPLS edge switch 122(2) to ATM/MPLS edge switch 122(1).

LSPs 400 and 402 can be configured as L-LSPs or E-LSPs. A L-LSP, or label only inferred per hop behaviour LSP, carries a single service level of traffic. The scheduling priority of the traffic for various L-LSP connections is established at LSP connect time and is based on the contents of outer label 318. The drop precedence value of each MPLS frame 312 is specified in its EXP field 322 of outer label 318.

Meanwhile, an E-LSP, or EXP inferred per hop behaviour LSP, carries one or more service levels of traffic. In MPLS network 104, the scheduling priority of the traffic for various E-LSP connections is based on the value of EXP field 322 of outer label 318. The value of EXP field 322 also indicates the drop precedence of an individual MPLS frame 312. MPLS switches 118 in MPLS network 104 will give the appropriate priority and drop precedence to MPLS frames 312 based on the value in EXP field 322. The scheduling priority of the traffic is dynamic and changes depending on the characteristics of the traffic.

In the embodiment, communication links 124 are fibre optic cables (410, 412) carrying uni-directional data between a MPLS switch 118 and an ATM/MPLS edge switch 122. Communication links 120 are fibre optic cables 410, 412 carrying unidirectional data between two MPLS switches 118.

In MPLS network 104, typically all LSPs 400 and 402 are configured as either E-LSPs or L-LSPs. However, ATM/MPLS edge switch 122 may be connected to multiple MPLS networks 104, some MPLS networks 104 having E-LSPs and others having L-LSPs.

3.1 Mapping of ATM Quality of Service and Drop Precedence Values to MPLS EXP Field Values in E-LSPs To convert internal cells 350 to MPLS frames 312 for an E-LSP, MPLS card 200 maps the appropriate value of EXP field 322 from ATM QoS parameters set for the corresponding ATM connection and the drop precedence of individual ATM cells 300 or frames 306 to provide the appropriate service level and drop precedence value for MPLS frame 312 in MPLS network 104. In ATM/MPLS edge switch 122 of the embodiment, this mapping is performed in two stages. The first stage maps the ATM QoS parameters to a class of service for the MPLS connection. The second stage maps the class of service for the connection and the CLP bit 355 of an individual internal cell 350 to the appropriate value for the EXP field 322 and inserts this value in the MPLS frame 312. Individual MPLS frames are then transmitted across MPLS network 104.

3.1.1 Mapping of ATM Quality of Service to a Class of Service

In the first stage of providing the appropriate value for EXP field 322 for transmission across E-LSPs, connections through ATM/MPLS edge switch 122 are mapped to one of eight (8) classes of service when the connection is established. The class of service assigned to a connection is determined by the value of its ATM QoS parameters. Referring to FIG. 5, table 500 provides an example of the mapping of ATM QoS parameters to the eight classes of service. Column 502 of table 500 lists the ATM service categories for a connection. Column 504 of table 500 lists the CLR values and column 506 lists the CDV values for a connection in microseconds (μs). As can be seen from FIG. 5, the class of service provided a connection, listed in column 508 of table 500, is determined by the values of its ATM service category, CLR and CDV. For example, a rt-VBR connection with a CDV of 1200 μs is mapped to class 1, indicated by row 512, while a rt-VBR connection with a CDV of 3000 μs is mapped to class 2, indicated by row 514. Also, three nrt-VBR connections with CLRs of $10^{-7}$, $10^{-6}$ and $10^{-5}$, respectively are mapped to classes 3, 4 and 5, respectfully, indicated by rows 516, 518 and 520.

Figure 6:
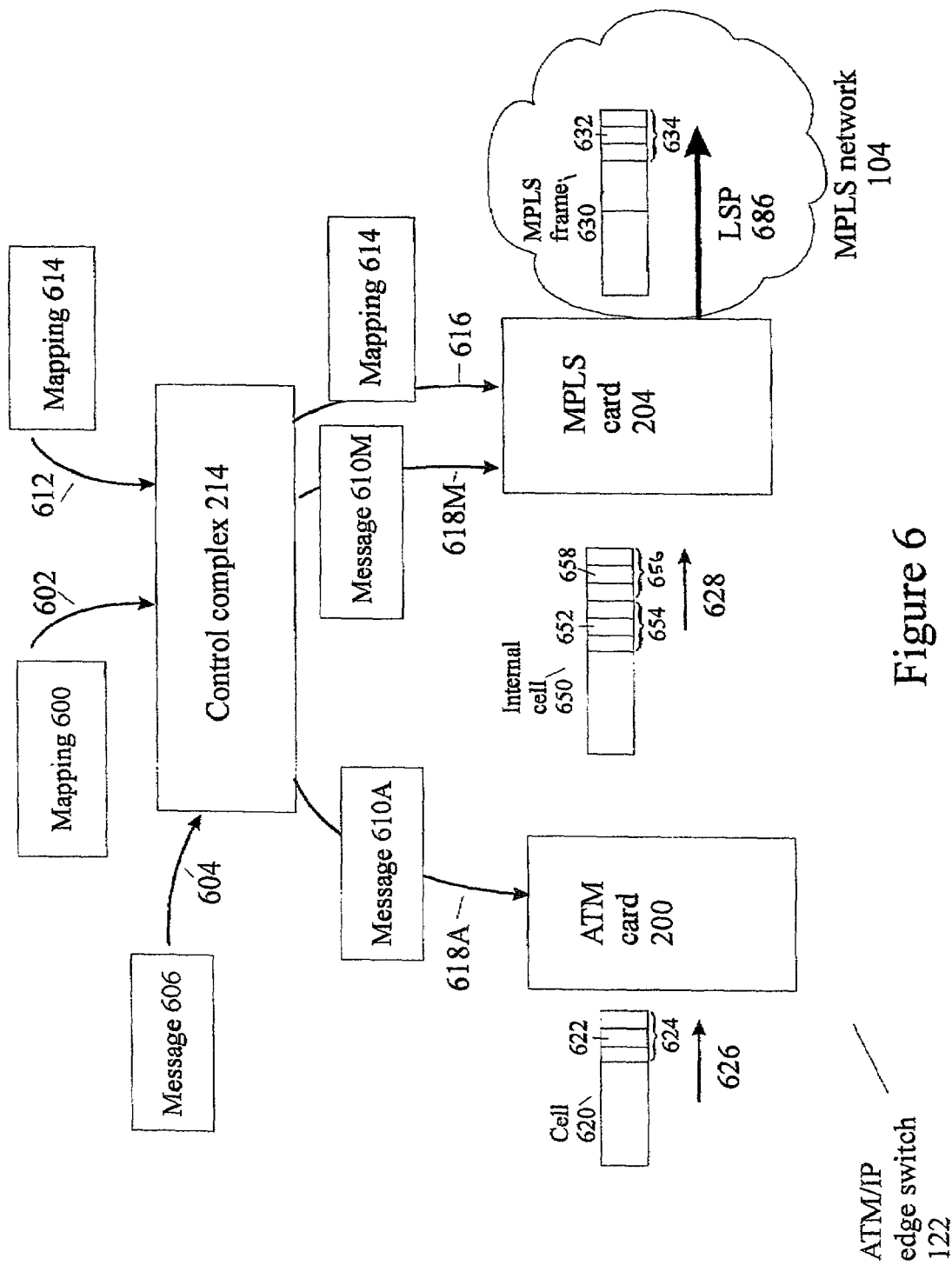
FIG. 6 is a block diagram of a portion of the ATM/MPLS edge switch of FIG. 1, illustrating exemplary loading of a value for an experimental (EXP) field in a MPLS frame for transmission over a EXP inferred per hop behaviour LSP (E-LSP) in the MPLS network.

Referring to FIG. 6, an example is provided of a connection through ATM/MPLS edge switch 122 with its MFLS card 204 and control complex 214. ATM/MPLS edge switch 122 is connected to an lSP 686 in MPLS network 104(1). LSP 686 in MPLS network 104(1) is configured as an E-LSP. Cell 620, with header 824 and CLP bit 822, is received by ATM card 200, indicated by arrow 626, which converts it into an internal cell 650 and transmits it to the appropriate egress MPLS card 204, indicated by arrow 628. Internal cell 650, with internal header 656, connection identifier field 658, header 654 and CLP bit 652, is received by MPLS card 204, its contents are transposed and MPLS frame 630, with outer label 634 and EXP field 632, and it is transmitted from MPLS card 204.

Prior to establishing connections through ATM/MPLS edge switch 122, a mapping 600 of ATM QoS parameters to class of service values is provided to control complex 214 of ATM/MPLS edge switch 122, indicated by arrow 602. Mapping 600 is not configurable by the user. In the embodiment, mapping 600 is that provided in table 500 of FIG. 5. It will be appreciated that other embodiments may use other mappings of ATM QoS to class of service. Control complex 214 also stores information concerning the configuration of its outgoing LSP 686 i.e. whether it is configured as an E-LSP or an L-LSP. Currently in the embodiment, if tunnel monitoring is enabled on tunnel 404, tunnel 404 is an E-LSP while tunnels 404 without tunnel monitoring enabled are L-LSPs. It will be appreciated that other methods of configuring tunnel 404 are possible and a tunnel 404 may be user configurable as an E-LSP or L-LSP.

Connections through ATM/MPLS edge switch 122 may be established by signalling connections or manual configurations. New connection message 606 is received at ATM/MPLS edge switch 122 at control complex 214, requesting a new connection through ATM/MPLS edge switch 122, indicated by arrow 604. Message 606 contains the ATM QoS parameters for the connection including its ATM service category, CLR and CDV. ATM/MPLS edge switch 122 can choose an appropriate route for the new connection through a LSP, such as LSP 686, or the user may specify that a specific LSP be used. The new connection in this example is routed through LSP 686.

Control complex 214 assigns a connection identifier for the new connection and determines the configuration of LSP 686 i.e. whether the LSP 686 is configured as an E-LSP or an L-LSP. The connection identifier, found in connection identifier field 658 of internal cell 650, is used by ATM/MPLS edge switch 122 as a label to track the connection. Control complex 244 maps the ATM QoS parameters to the class of service using mapping 600. The information can then be sent to MPLS card 204 for the second stage of mapping class of service and drop precedence to a value for EXP field 632.

3.1.2 Mapping of Class of Service and Drop Precedence to EXP Value

In the second stage of providing the appropriate value for EXP field 632 for transmission across E-LSPs, MPLS card 204 of ATM/MPLS edge switch 122 maps the class of service for the connection and the drop precedence value of each internal cell 650 to a value for EXP field 632. MPLS card 204 inserts the appropriate value into EXP field 632 of each outgoing MPLS frame 630 and transmits them over the E-LSP, LSP 686, of MPLS network 104. Referring to FIG. 7, table 700 provides an example of a mapping of class of service levels and drop precedence values to values for EXP field 632.

Column 702 of table 700 lists the class of service for connections being routed through ATM/MPLS edge switch 122. Columns 704 and 706 map of the value of EXP field 632 to the class of service for CLP bit 652 equal to zero and one, respectively. For example, an internal cell 650 with CLP bit 652 equal to "0" belonging to a connection with class of service 7 (row 722, column 704) will have the value 6, "110" in binary, inserted into EXP field 632 of MPLS frame 630. The mapping of table 700 is configurable by the user and ATM/MPLS edge switch 122 may use a different mapping for each connected MPLS network 104.

Referring again to FIG. 6, an example is provided of the mapping of the ATM class of service for a connection and the drop precedence of each cell 620 to a value for EXP field 632. Prior to establishing connections through ATM/MPLS edge switch 122, mapping 614 of the class of service and the drop precedence to a value for EXP field 632 is provided to control complex 214 of ATM/MPLS edge switch 122, indicated by arrow 612. Mapping 614 may be that provided in table 700 of FIG. 7. Mapping 614 is provided to MPLS card 204, indicated by arrow 616, upon installation of MPLS card 204.

In response to a message 606 at its control complex 214 to configure a new connection through ATM/MPLS edge switch 122, indicated by arrow 604, ATM/MPLS edge switch 122 assigns a connection identifier and a class of service, as described earlier. Control complex 214 establishes the connection through MPLS card 204 by sending message 610A containing the connection identifier and the identity of the egress MPLS card 204 to ATM card 200, indicated by arrow 618A. Control complex 214 also determines that LSP 686 to be used by this connection is configured as an E-LSP. Therefore, control complex 214 sends message 610M containing the connection identifier, the configuration of LSP 686 and class of service to MPLS card 204, indicated by arrow 618M.

When a cell 620, with header 624 and CLP bit 622, arrives at ATM card 200, indicated by arrow 626, ATM card 200 converts cells 620 into internal cells 650 as described above. In this conversion, ATM card 200 converts header 624 to header 654, maps CLP bit 622 to CLP bit 652 and adds internal header 656 which contains the value of the connection identifier assigned to this connection in connection identifier field 658. ATM card 200 then sends internal cells 650 to the fabric card 202 (not shown) as described earlier. Fabric card 202 routes internal cells 650 to the appropriate egress MPLS card 204.

When an internal cell 650 arrives at MPLS card 204, indicated by arrow 628, MPLS card 204 reads the connection identifier from connection identifier field 658 of internal header 656 and the value of CLP bit 652 from header 654 of internal cell 650. The value of the connection identifier indicates the class of service to MPLS card 204 as this was contained in message 610M when the connection was established. The connection identifier also indicates to MPLS card 204 that its LSP 686 is configured as an E-LSP and mapping 614 should be used to find the appropriate value for EXP field 632. MPLS card 204 queues internal cells 650 from this connection identifier before forming a MPLS frame 630 from them.

As described previously, one or more internal cells 650 are formed into a MPLS frame 630. Each internal cell 650 may have different CLP bit 652 values in header 654. As known in the art, there are several methods of mapping cells having different values for their CLP bit 652 to an overall value for CLP bit 652 to determine the drop precedence value of an assembled frame. One method assigns the value of the drop precedence of the assembled frame to one if one internal cell 650 of the frame has a CLP bit 652 equal to one. Another method uses the value of the CLP bit 652 of the first cell to be assembled into the frame to dictate the overall value for CLP bit 652.

Once the overall value for CLP bit 652 is determined, MPLS card 204 maps this value and the class of service for the connection to a value for EXP field 632 using mapping 614. MPLS card 204 forms a MPLS frame 630 from one or more internal cells 650, as described above, and inserts the appropriate value for EXP field 632 into outer label 634. MPLS frame 630 is transmitted over LSP 686 through MPLS network 104(1).

3.2 Mapping of Drop Precedence to EXP Field in L-LSPs

Figure 8:
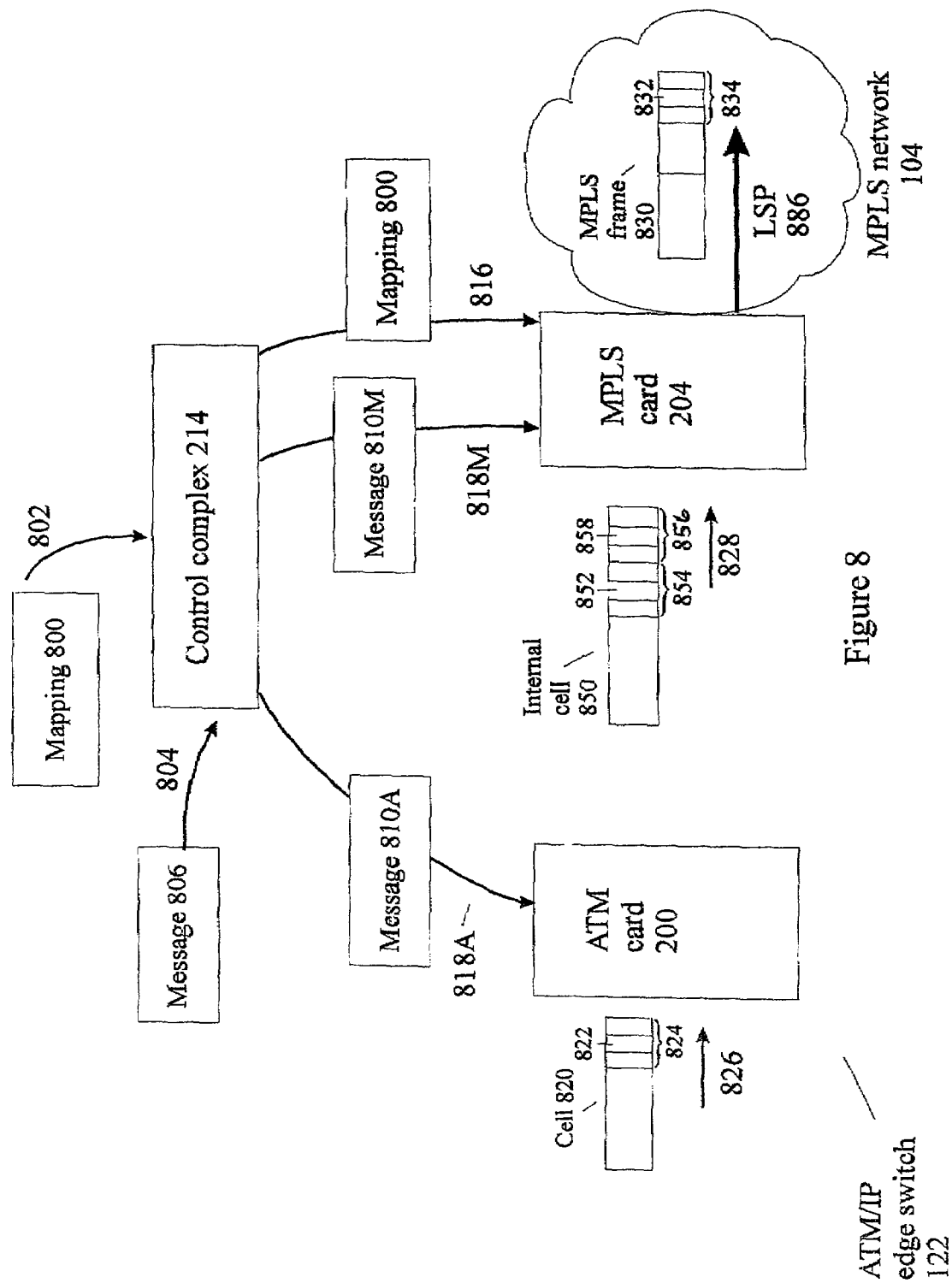
FIG. 8 is a block diagram exemplary of providing a value for the EXP field in a MPLS frame in the ATM/MPLS edge switch of FIG. 1 for transmission over an label inferred per hop behaviour LSP (L-LSP)

FIG. 8, illustrates an example of establishing a connection in ATM/MPLS edge switch 122. The ATM/MPLS edge switch 122 has control complex 214 and MPLS card 204 connected to another LSP 886 in MPLS network 104(2). LSP 886 in MPLS network 104(2) is configured as an L-LSP. Cell 820, having header 824 and CLP bit 822, is received by ATM card 200, indicated by arrow 826, which converts it into an internal cell 850 and transmits it to the appropriate egress MPLS card 204, indicated by arrow 828. Internal cell 850, having internal header 856, connection identifier field 858, header 854 and CLP bit 852, is received by MPLS card 204, its contents are transposed to and MPLS frame 830, having outer label 834 and EXP field 832, and it is transmitted from MPLS card 204.

When converting internal cells 850 to MPLS frames 830 for an L-LSP, MPLS card 200 sets the appropriate value of EXP field 832 to provide the appropriate drop precedence for MPLS frame 830 in MPLS network 104. For the overall value for CLP bit 852 being zero (0) in internal cell 850, MPLS card 200 sets EXP field 832 to 1, "001" in binary. For overall value for CLP bit 852 being one (1) in internal cell 850, MPLS card 200 sets EXP field 832 to 2, "010" in binary.

Prior to establishing connections through ATM/MPLS edge switch 122, a mapping 800 of the drop precedence to a value for EXP field 832 is provided to control complex 214 of ATM/MPLS edge switch 122, indicated by arrow 802. Mapping 800 is as described above (zero to "001" and one to "010") and is not configurable by the user. Mapping 800 is provided to MPLS card 204 upon installation of MPLS card 204. Control complex 214 also stores information concerning the configuration of its outgoing LSPs 886 i.e. whether it is configured as an E-LSP or an L-LSP.

New connections through ATM/MPLS edge switch 122 may be established by known signalling methods or manual methods known in the art. ATM/MPLS edge switch 122 receives a message 806 at control complex 214 to configure a new connection through ATM/MPLS edge switch 122, indicated by arrow 804. ATM/MPLS edge switch 122 can choose an appropriate route for the new connection through a LSP, such as LSP 886, or the user may specify that a specific LSP be used. The new connection in this example is routed through LSP 886. Control complex 214 assigns a connection identifier for the new connection and determines the configuration of LSP 886 i.e. whether the LSP 886 is configured as an E-LSP or an L-LSP.

Control complex 214 establishes the connection through MPLS card 204 by sending message 810A containing the connection identifier and the identity of the egress MPLS card 204 to ATM card 200, indicated by arrow 818A. Control complex 214 also determines that LSP 886 for the connection is configured as an L-LSP. Therefore, control complex 214 sends message 810M containing the connection identifier and the configuration of LSP 886 to MPLS card 204, indicated by arrow 818M.

When a cell 820, having header 824 and CLP bit 822, arrives at ATM card 200, indicated by arrow 826, ATM card 200 converts cells 820 into internal cells 850 as described above. In this conversion, ATM card 200 converts header 824 to header 854, maps CLP bit 822 to CLP bit 852 and adds internal header 856 which contains the value of the connection identifier assigned to this connection in connection identifier field 858. ATM card 200 then sends internal cells 850 to fabric card 202 (not shown). Fabric card 202 routes internal cells 850 to the appropriate egress MPLS card 204, indicated by arrow 828.

When an internal cell 850 arrives at MPLS card 204, indicated by arrow 828, MPLS card 204 reads the connection identifier from internal header 828 and the value of CLP bit 852 from header 854 of internal cell 850. MPLS card 204 queues internal cells 850 from this connection identifier before forming a MPLS frame 830 from them.

MPLS card 204 determines the overall value of CLP bit 852 from internal cells 850, as described previously. The connection identifier of each internal cell 850 indicates to MPLS card 204 that its LSP 886 is configured as an L-LSP and mapping 800 should be used to find the appropriate value for EXP field 832. Mapping 800 matches the overall value for CLP bit 852 to the appropriate value for EXP field 832. MPLS card 204 forms a MPLS frame 830 from one or more internal cells 850, as described earlier, and inserts the appropriate value for EXP field 832 into outer label 834. MPLS frame 830 is transmitted over LSP 886 through MPLS network 104(2).

4.0 Customizing Mapping of Class of Service and Drop Precedence to EXP Value

As mentioned previously, a user may customize the mapping of class of service and drop precedence to EXP value for E-LSPs. Referring again to FIG. 2, a terminal (not shown) is connected to control complex 214 in ATM/MPLS edge switch 122. A user communicates with control complex 214 through the terminal to customize the above mapping. As mentioned previously, the user cannot customize the mapping of ATM QoS parameters to class of service for E-LSPs or the drop precedence to the value of EXP field for L-LSPs.

The default mapping of class of service and drop precedence to EXP value for E-LSPs used by ATM/MPLS edge switch 122 behaves as an L-LSP. In this mapping, shown in table 900 of FIG. 9, the outgoing MPLS frame 312 has the value of EXP field 322 set to 1, "001" in binary, for the overall value of CLP bit 355 in internal cells 350 equal to zero, indicated by column 902, and 2, "010" in binary, for overall value of CLP bit 355 in internal cells 350 equal to one, indicated by column 904.

With the mapping in table 900, it will be appreciated that values for EXP field 322 may be determined for L-LSPs as it is for E-LSPs with a double mapping instead of the single mapping described in relation to FIG. 8. In this situation, the first mapping maps the QoS parameters to a class of service for the connection. The second mapping maps the value of CLP bit 355 of a cell 300 to EXP value 322 regardless of the value determined for the class of service, as shown in table 9 of FIG. 9.

5.0 Quality of Service for a MPLS Connection Interfacing to an ATM Network

When MPLS frame 312 is transmitted to ATM/MPLS edge switch 122, ATM/MPLS edge switch 122 examines inner label 318 and outer label 320 and generates internal cells 350 which are then converted to ATM cells 300. Cells 300 are then routed within ATM network 102 based on the ATM QoS parameters for the connection, as is known in the art. CLP bit 355 was initially contained in header 316 of MPLS frame 312 when internal cells 350 were converted to MPLS frames 312. The drop precedence of a cell 300 is converted from header 316 of MPLS frame 312 to form CLP bit 355 of internal cell 350 which is then mapped to CLP bit 305 of cell 300.

Figure 9:
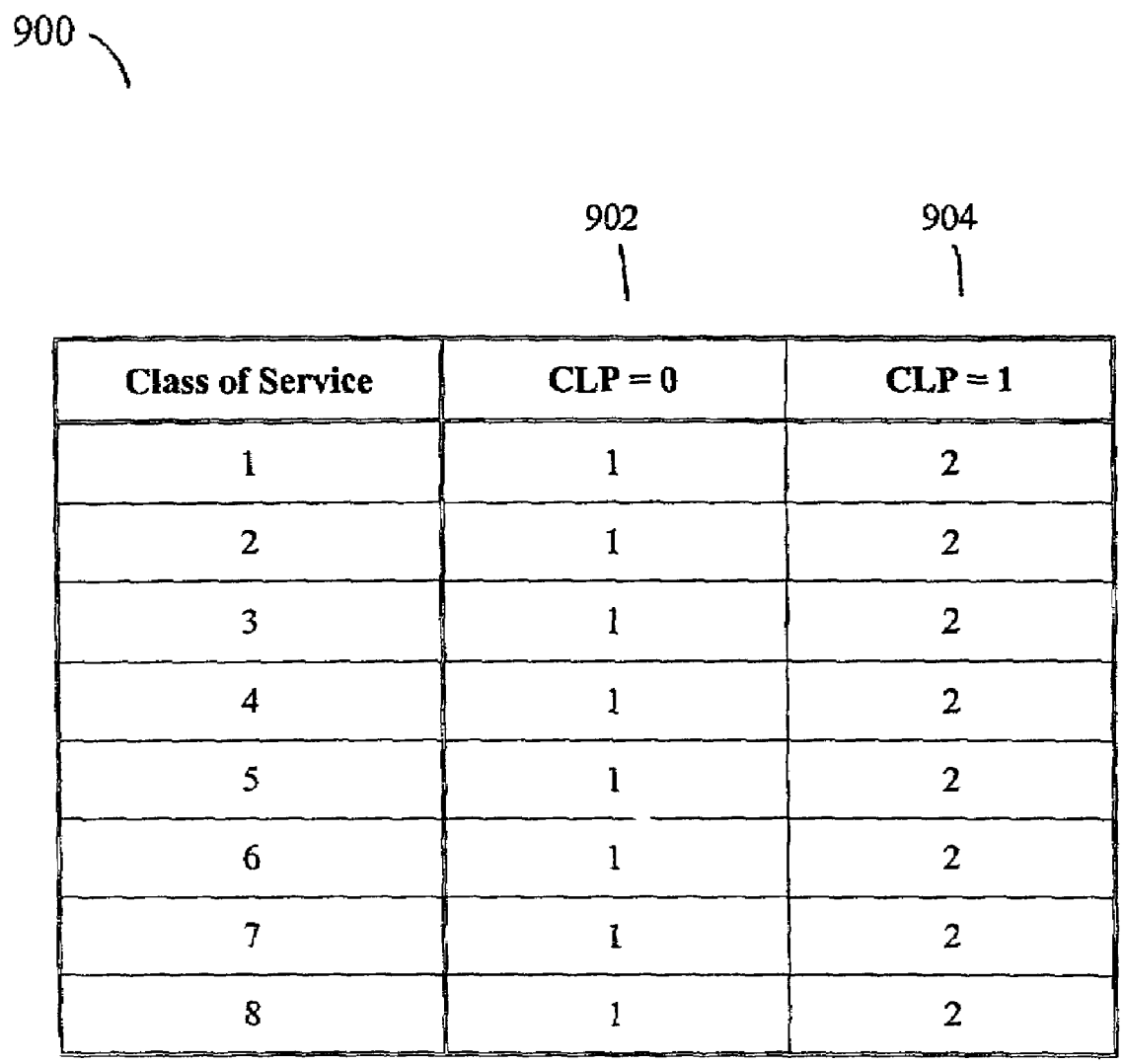
FIG. 9 is a table of a default mapping of class of service and drop precedence of a cell to a value for the EXP field in a MPLS frame in the ATM/MPLS edge switch of FIG. 1.

It will be appreciated that the other mapping parameters may be used instead of those described for FIGS. 7 and 9 for other embodiments.

It is noted that those skilled in the art will appreciate that various modifications of detail may be made to the present embodiment, all of which would come within the scope of the invention.

We claim:

1. A method for translating at least one ATM quality of service (QoS) parameter related to an ATM transmission protocol from said ATM transmission protocol to a MPLS transmission protocol for an ATM cell being sent on a connection from an ATM communication network utilizing said ATM transmission protocol to a MPLS communication network utilizing said MPLS transmission protocol, said method comprising:

mapping said at least one ATM QoS parameter to a MPLS class of service value for said connection;

mapping said MPLS class of service value and a drop precedence value of said ATM cell to an experimental field value for indicating a MPLS quality of service provisioning;

converting said ATM cell to a MPLS frame; and,
incorporating said experimental field value into said MPLS frame for transmission through the MPLS network;
wherein:
said at least one ATM QoS parameter includes at least one of an ATM service category, a cell loss ratio, and a cell delay variation;
said experimental field value indicates drop precedence for said MPLS frame in addition to said MPLS class of service value; and,
said MPLS class of service value is one of a number of MPLS class of service values, said drop precedence value is one of first and second drop precedence values, said experimental field value is one of a number of experimental field values, and each of said MPLS class of service values is assigned first and second experimental field values selected from said number of experimental field values, said first and second experimental field values being associated with said first and second drop precedence values, respectively.

2. The method of claim 1, wherein said MPLS frame is transmitted through a label switched path of said MPLS network, wherein said label switched path is an experimental inferred per hop behaviour label switched path (E-LSP), wherein said number of MPLS class of service values is eight, wherein said number or experimental field values is eight, and wherein said first and second experimental field values are selected from first and second groups of four of said eight experimental field values, respectively.

3. The method of claim 1, wherein said label switched path is a label inferred per hop behaviour label switched path (L-LSP), wherein said number of MPLS class of service values is eight, and wherein said number of experimental field values is two.

4. A translation module for a network element, said translation module translating at least one ATM quality of service (QoS) parameter related to an ATM transmission protocol from said ATM transmission protocol to a MPLS transmission protocol for an ATM cell being sent on a connection from an ATM communication network utilizing said ATM transmission protocol to a MPLS conunuication network utilizing said MPLS transmission protocol, said network element connected to said ATM communication network and said MPLS communication network, said network element receiving said ATM cell from said ATM communication network and communicating said ATM cell to said translation module, said network element transmitting said ATM cell from said network element over said MPLS communication network after translation of said at least one ATM QoS parameter, said translation module comprising:
a control complex for mapping said at least one ATM QoS parameter to a MPLS class of service value for said connection;
a MPLS card connected to said control complex
for mapping said MPLS class of service value and a drop precedence value of the ATM cell to an experimental field value for indicating a MPLS quality of service provisioning, for converting said ATM cell to a MPLS frame, and for
incorporating said experimental field value into said MPLS frame for transmission through the MPLS network;

wherein:
said at least one ATM QoS parameter includes at least one of an ATM service category, a cell loss ration, and a cell delay variation;
said experimental field value indicates drop precedence for said MPLS frame in addition to said MPLS class of service value; and,
said MPLS class of service value is one of a number of MPLS class of service values, said drop precedence value is one of first and second drop precedence values, said experimental field value is one of a number of experimental field values, and each of said MPLS class of service values is assigned first and second experimental field values selected from said number of experimental field values, said first and second experimental field values being associated with said first and second drop precedence values, respectively.

5. The translation module of claim 4, wherein said network element includes an ATM card, said ATM card providing an interface for said ATM network, said ATM card receiving said ATM cell from said ATM network and communicating said ATM cell to said translation module, said ATM card is a line card, said MPLS card is a line card, said MPLS card providing an interface for said MPLS network and said MPLS card transmitting said MPLS frame over said MPLS network.

6. The translation module of claim 4, wherein said MPLS frame is transmitted through a label switched path of said MPLS network, wherein, wherein said label switched path is an experimental inferred per hop behaviour label switched path (E-LSP), wherein said number of MPLS class of service values is eight, wherein said number of experimental field values is eight, and wherein said first and second experimental field values are selected from first and second groups of four of said eight experimental field values, respectively.

7. The translation module of claim 4, wherein said label switched path is a label inferred per hop behaviour label switched path (L-LSP), wherein said number of MPLS class of service values is eight, and wherein said number of experimental field values is two.

8. A method for formatting a MPLS frame to support an ATM quality of service (QoS) parameter related to at least one ATM cell when said MPLS frame is transmitted on a MPLS communication network, said method comprising:
mapping said ATM QoS parameter to a MPLS class of service value for a MPLS connection for said MPLS frame;
mappig said MPLS class of service value and a drop precedence of said at least on ATM cell to an experimental field value for indicating a MPLS quality of service provisioning;
inserting said experimental field value an experimenmai field of a header of said MPLS frame; and
inserting contents of said ATM cell in said MPLS frame,
wherein said experimental field value further indicates drop precedence for said MPLS frame, said drop precedence of said at least one ATM cell utilizes a value of drop precedence for each of said at least one ATM cell, and said ATM QoS parameter further includes at least one of an ATM service category, a cell loss ratio and a cell delay variation.

9. A method for routing at least one ATM cell through a MPLS network, said method comprising:
    mapping an ATM quality of service (QoS) parameter related to the at least one ATM cell to a MPLS class of service value for a MPLS connection for said MPLS network;
    mapping said MPLS class of service value and a drop procedence of said at least on ATM cell to an experimental field value for indicating a MPLS quality of service provisioning;
    creating a MPLS frame;
    inserting said experimental field value into an experimental field of a header of said MPLS frame;
    inserting contents of said at least one ATM cell in said MPLS frame;
    routing said MPLS frame through one or more routers in said MPLS network according to said experimental field value;
    wherein:
        said experimental field value further indicates drop precedence for said MPLS frame, said drop precedence of said at least one ATM cell utilizes a value of drop precedence for each of said at least one ATM cell, and said ATM QoS parameter further includes a at least one of an ATM service category, a cell loss ratio, and a cell delay variation; and,
        said experimental field value specifies experimental (EXP) inferred label switched path scheduling treatment and drop precedence treatment.

10. A method for transporting data traffic of a first transmission protocol through an MPLS network from an edge network element connected to an ingress point of the MPLS network to an egress point of the MPLS network, while maintaining a quality of service (QoS) of the data traffic, the method comprising:
    providing a first mapping table with correspondence between a plurality of QoS parameters relating to the data traffic arriving at the edge network element and a plurality of classes of service for MPLS frames generated from the data traffic at said edge network element for transmission through the MPLS network, each one of the plurality of classes of service for maintaining a QoS of its corresponding QoS parameter in the MPLS network;
    identifying a QoS parameter of a data element of the data traffic arriving at the edge device over a connection and encapsulating content from the data element into a MPLS frame;
    consulting the first mapping table to identify one class of the plurality of classes of service corresponding to the QoS parameter of the data element;
    consulting a second mapping table to identify a label field value associated with the one class of service and with a drop precedence value for the data element;
    inserting the label field value into an unused field of an outer label of the MPLS frame carrying the data element; and
    transporting the MPLS frame across the MPLS network, the MPLS frame identifying the one class of service and the drop precedence value for the data element to maintain the QoS of the data traffic.

11. The method of claim 10, wherein the unused field is an EXP field of the MPLS frame.

12. The method of claim 11, wherein the first transmission protocol is ATM and the data element is an ATM cell.

13. The method of claim 12, wherein the QoS parameter provides scheduling priority for the ATM cell.

14. The method of claim 13, wherein the ATM cell arrives at the edge network element in an ATM connection, and the QoS parameter identifies: a service category for the ATM connection; a cell loss ratio (CLR) for the ATM connection; and a cell delay variation (CDV) for the ATM connection.

15. The method of claim 14, wherein for the first mapping table, each of the plurality of QoS parameters defines properties relating to at least one of an ATM service category, a CLR and a CDV.

16. The method of claim 15, wherein each of the plurality of classes of service for MPLS frames is one of eight classes, and the first mapping table defines a correspondence between:
    a first class to: the properties including an ATM service category of constant bit rate (CBR); or, the properties including an ATM service category of real-time variable bit rate (rtVBR) and 250 us $\leq$ CDV<2,500 us;
    a second class to the properties including an ATM service category of real-time variable bit rate (rtVBR) and 2,500 us $\leq$ CDV<10,000 us;
    a third class to the properties including an ATM service category of non-real-time variable bit rate (nrtVBR) and a CLR of $10^{-7}$;
    a fourth class to the properties including an ATM service category of non-real-time variable bit rate (nrtVBR) and a CLR of $10^{-6}$;
    a fifth class to the properties including an ATM service category of non-real-time variable bit rate (nrtVBR) and a CLR of $10^{-5}$;
    a sixth class to the properties including an ATM service category of non-real-time variable bit rate (nrtVBR) and a CLR of $10^{-1}$ to $10^{-4}$;
    a seventh class to the properties including an ATM service category of available bit rate (ABR); and
    an eighth class to the properties including an ATM service category of unspecified bit rate (UBR), a CLR of any value, and a CDV of any value.

17. The method of claim 16, wherein the drop precedence value is derived from a cell loss priority (CLP) bit of the data element, and:
    if the CLP bit is 0 and if the MPLS frame is transported over a label inferred per hop behaviour label switched path (L-LSP), then the label field value has a value of "1"; and,
    if the CLP bit is 1 and if the MPLS frame is transported over a label inferred per hop behaviour label switched path (L-LSP), then the label field value has a value of "2".

18. A method for translating at least one quality of service (QoS) parameter related to a first cell-based transmission protocol from said first cell-based transmission protocol to a second transmission protocol for a data element being sent on a connection from a first cell-based commmunication network utilizing said first transmission protocol to a second communication network utilizing said second transmission protocol, said method comprising:
    mapping said at least one QoS parameter to a class of service value for said connection;
    mapping said class of service value and a drop precedence value of the data element to a label field value indicating a quality of service provisioning for said second transmission protocol;

converting said data element of said connection to a second data element associated with said second transmission protocol; and, incorporating said label field value into said second data element for transmission of said second data element in the second network with the second transmission protocol;

wherein said class of service value is one of a number of class of service values, said drop precedence value is one of first and second drop precedence values, said label field value is one of a number of label field values, and each of said class of service values is assigned first and second label field values selected from said number of label field values, said first and second label field values being associated with said first and second drop precedence values, respectively.

* * * * *

UNITED STATES PATENT AND TRADEMARK OFFICE
CERTIFICATE OF CORRECTION

| | |
|---|---|
| PATENT NO. | : 7,257,121 B2 |
| APPLICATION NO. | : 10/023643 |
| DATED | : August 14, 2007 |
| INVENTOR(S) | : Timothy Harris Kuhl et al. |

It is certified that error appears in the above-identified patent and that said Letters Patent is hereby corrected as shown below:

1. Specification, column 1, line 54: Insert a period after the word "element".

2. Specification, column 2, line 2: Replace the word "an" with the word --a--.

3. Specification, column 6, line 41: Replace the word "act" with the word --art--.

4. Specification, column 7, line 18: Replace the word "unidirectional" with the word --uni-directional--.

5. Specification, column 7, line 48: Replace the word "unidirectional" with the word --uni-directional--.

6. Specification, column 8, line 31: Replace the word "MFLS" with the word --MPLS--.

7. Specification, column 8, line 33: Replace the word "ISP" with the word --LSP--.

8. Specification, column 9, line 9: Replace the number "658" with the number --358--.

9. Claim 4, column 13, line 44: Replace the word "conunumication" with the word --communication--.

10. Claim 4, column 14, line 2: Replace the word "ration" with the word --ratio--.

11. Claim 6, column 14, line 32: Delete "wherein," after "network,".

12. Claim 8, column 14, line 53: Replace the word "mappig" with the word --mapping--.

13. Claim 8, column 14, line 57: Insert the word --into-- after the word "value".

14. Claim 8, column 14, line 57: Replace the word "experimenmai" with the word --experimental--.

15. Claim 9, column 15, line 8: Replace the word "procedence" with the word --precedence--.

16. Claim 9, column 15, line 24: Delete the word "a".

UNITED STATES PATENT AND TRADEMARK OFFICE
CERTIFICATE OF CORRECTION

PATENT NO. : 7,257,121 B2
APPLICATION NO. : 10/023643
DATED : August 14, 2007
INVENTOR(S) : Timothy Harris Kuhl et al.

It is certified that error appears in the above-identified patent and that said Letters Patent is hereby corrected as shown below:

17. Claim 17, column 16, line 49: Replace the word "I" with the number --1--.

Signed and Sealed this

Twentieth Day of November, 2007

JON W. DUDAS
*Director of the United States Patent and Trademark Office*